(12) United States Patent
Crowne et al.

(10) Patent No.: US 11,582,304 B2
(45) Date of Patent: Feb. 14, 2023

(54) DISTRIBUTED SENSING PROCESSING SYSTEMS

(71) Applicant: Simmonds Precision Products, Inc., Vergennes, VT (US)

(72) Inventors: Thomas Crowne, Weybridge, VT (US); Thomas Henck, Huntington, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 0 days.

(21) Appl. No.: 16/723,105

(22) Filed: Dec. 20, 2019

(65) Prior Publication Data

US 2021/0194965 A1  Jun. 24, 2021

(51) Int. Cl.
*H04L 67/12* (2022.01)
*H04L 67/10* (2022.01)
*H04Q 9/00* (2006.01)

(52) U.S. Cl.
CPC .............. *H04L 67/12* (2013.01); *H04L 67/10* (2013.01); *H04Q 9/00* (2013.01); *H04Q 2213/13034* (2013.01); *H04Q 2213/13535* (2013.01)

(58) Field of Classification Search
CPC ........... H04L 67/12; H04L 67/10; H04Q 9/00; H04Q 2213/13034; H04Q 2213/13535
See application file for complete search history.

(56) References Cited

U.S. PATENT DOCUMENTS

| | | | |
|---|---|---|---|
| 5,227,987 A | 7/1993 | Imazawa et al. | |
| 6,094,726 A | 7/2000 | Gonion et al. | |
| 8,175,850 B2 | 5/2012 | Nelson et al. | |
| 8,478,319 B2 | 7/2013 | Azimi-Sadjadi et al. | |
| 9,959,208 B2 | 5/2018 | Rencs et al. | |
| 10,196,152 B2 | 2/2019 | Gang et al. | |
| 10,402,236 B2 | 9/2019 | Gang et al. | |
| 10,687,007 B2* | 6/2020 | Kim | H04N 5/335 |
| 2012/0155399 A1* | 6/2012 | Antony | H04W 72/04 370/329 |

(Continued)

OTHER PUBLICATIONS

Extended European search report issued in corresponding EP application No. 20216017.2 , dated Apr. 29, 2021.

*Primary Examiner* — Sm A Rahman
(74) *Attorney, Agent, or Firm* — Locke Lord LLP; Daniel J. Fiorello; Gabrielle L. Gelozin

(57) ABSTRACT

A smart sensor can include a plurality of analog-to-digital converters (ADCs) configured to receive analog signals from a sensor module, and a plurality of channel modules. Each channel module can be connected to a respective ADC and each channel module can include a limited data processing module configured to provide initial processing. The sensor can include a data control module operatively connected to each of the plurality of channel modules and configured to select a selected channel of the plurality of channels to receive initially processed data from the limited data processing module of the selected channel. The data control module can be configured to interface with external memory to store data to the external memory and/or to read data from the external memory. The sensor can include a batch processing module operatively connected to the data control module and configured to receive the initially processed data of the selected channel from the data control module to provide further processing of the initially processed data.

18 Claims, 10 Drawing Sheets

(56) References Cited

U.S. PATENT DOCUMENTS

| | | | |
|---|---|---|---|
| 2012/0167097 A1* | 6/2012 | Condorelli | G06F 9/4843 |
| | | | 718/101 |
| 2013/0253735 A1 | 9/2013 | Roy et al. | |
| 2013/0297840 A1 | 11/2013 | Kagan et al. | |
| 2014/0089555 A1* | 3/2014 | Shalem | G06F 13/36 |
| | | | 710/316 |
| 2014/0324389 A1* | 10/2014 | Baldwin | G01D 21/00 |
| | | | 702/187 |
| 2017/0075826 A1 | 3/2017 | Aue et al. | |
| 2019/0146830 A1* | 5/2019 | Gerber | G06N 20/00 |
| | | | 718/101 |
| 2020/0019155 A1* | 1/2020 | Cella | G05B 13/028 |
| 2020/0096988 A1* | 3/2020 | Cella | G05B 19/4183 |

* cited by examiner

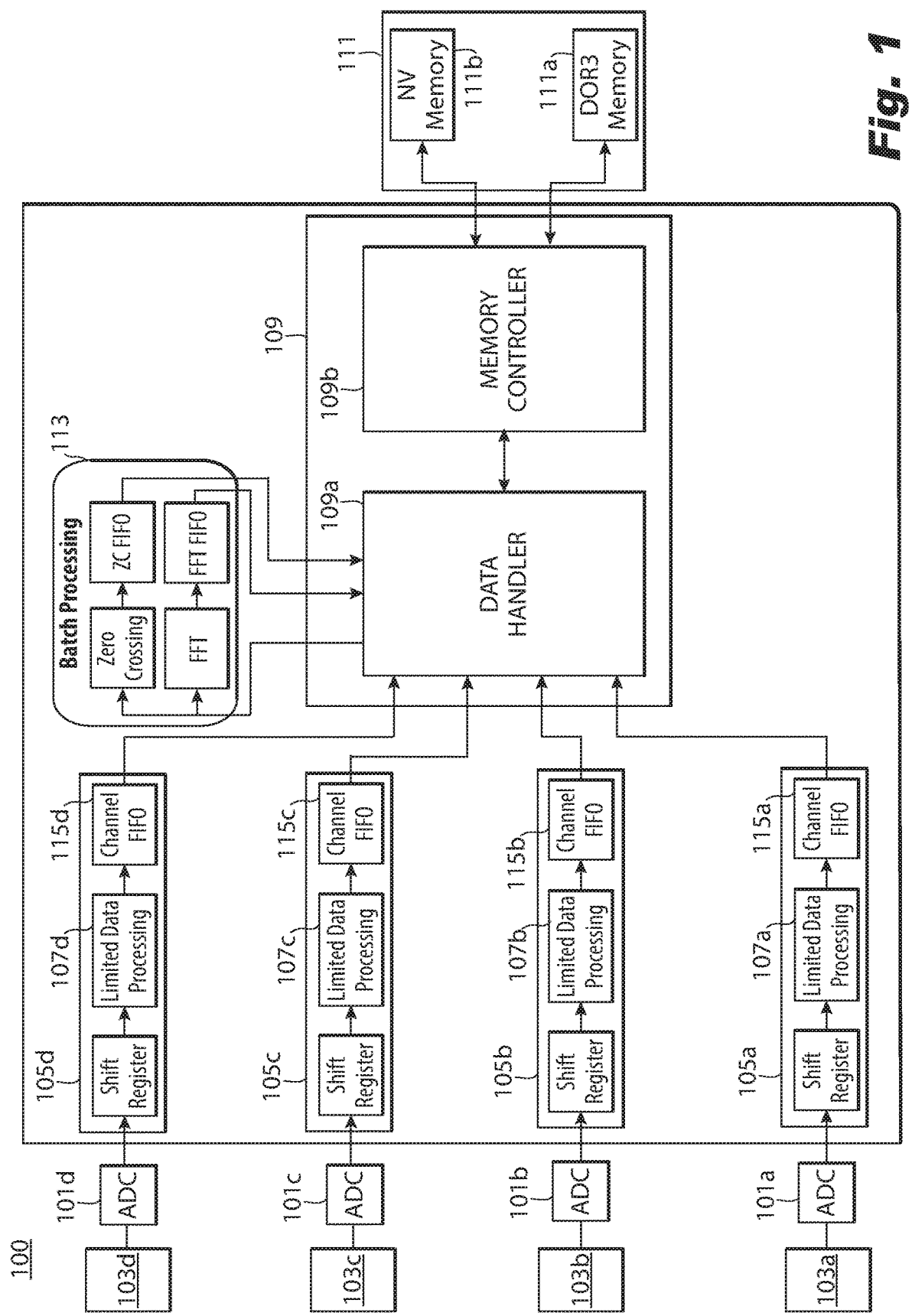

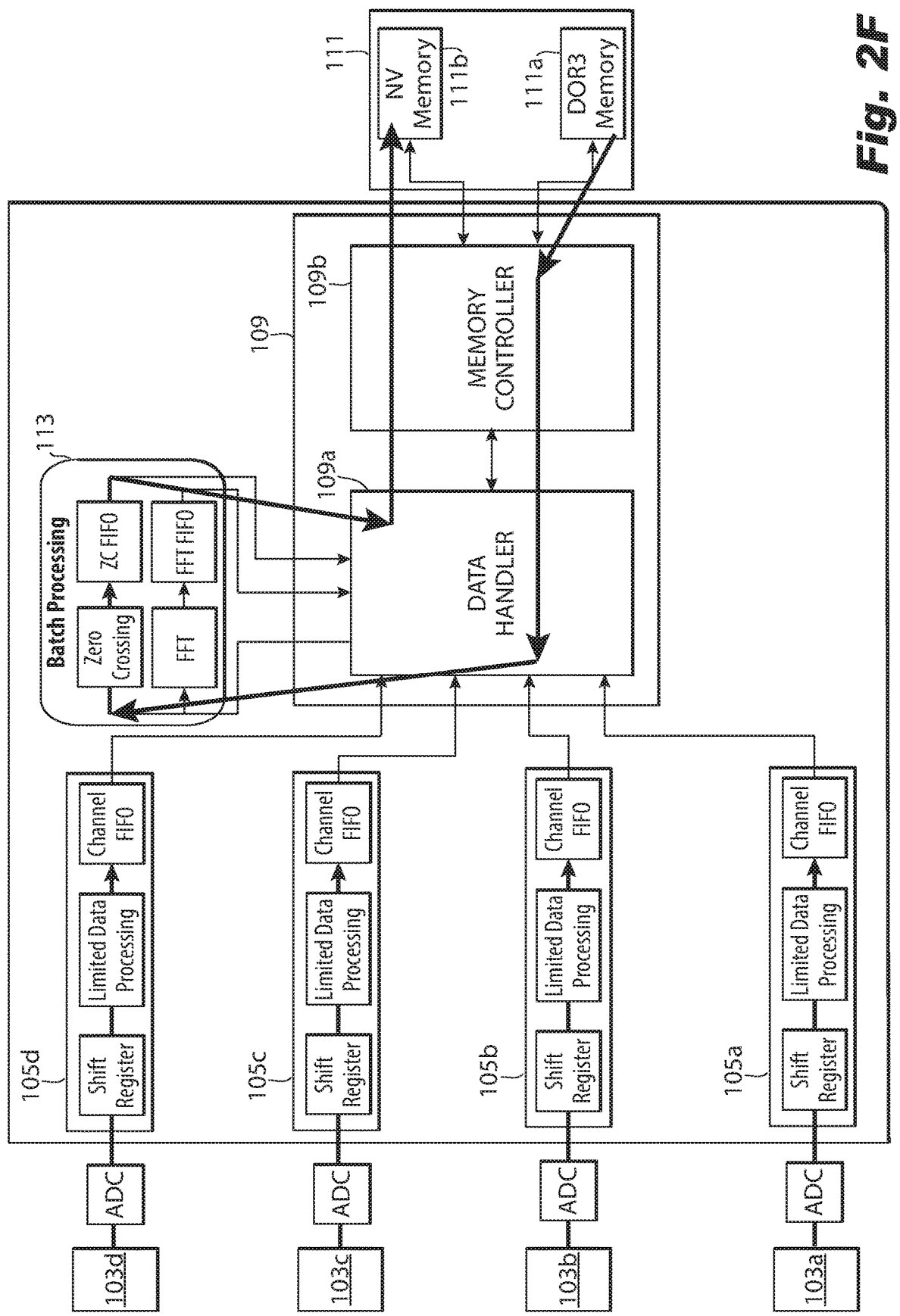

DISTRIBUTED SENSING PROCESSING SYSTEMS

FIELD

This disclosure relates to data processing systems, e.g., for distributed sensing systems.

BACKGROUND

Condition monitoring systems are used to monitor parameters in machinery via temperature, pressure, vibration sensors, etc., e.g., to detect the development of faults as compared to normal operating conditions. The sensor data collected is digitized, transformed and algorithmically processed to extract features of the monitored system. A given feature can be generated from the input of one sensor or could be dependent on the interaction of multiple sensors. Features extracted are compared against expected values, enumerating the relative health of that feature. Sensor data is monitored and evaluated on a scheduled basis, as a function of the regime the monitored system is in, and/or based upon the detection of an event outside of normal operating conditions. Traditional implementations of a condition monitoring system consist of a number of analog sensors feeding into a central host for digitization and further processing. This implementation requires individual cabling for each analog sensor and can result in a heavy system and complicated installation. These issues can be mitigated by distributing digitization and processing of data out locally to the sensor.

Sensors that have the capability to perform local digitization and processing are known as digital or smart sensors. Local processing of data reduces the processing load on the host, allowing the host to perform other more complex functions, or decrease in size and complexity. Transmission of digital data allows multiple digital sensors to be connected on a single digital bus, reducing the wire weight associated with individual analog wire runs for each sensor. Some smart sensing systems are required to be small and consume very little power while retaining high levels of performance. In those cases they may utilize programmable logic devices (PLD) instead of a processor. Due to high costs associated with the DO-254 certification process, it is desirable for a PLD based smart sensing system to accommodate many typical processing types out of the box with minimal configuration and no firmware modification. The computation of features can typically be broken down into a sequence of fundamental processing blocks (i.e. low pass filter, multiplication, FFT). In a PLD (programmable logic device), processing is accomplished by instantiating logical blocks in the device that perform the calculation required for that particular type of processing. Instantiating logical blocks uses up that block so that it may not be utilized for anything other than that calculation.

Such conventional methods and systems have generally been considered satisfactory for their intended purpose. However, there is still a need in the art for improved distributed sensing processing systems. The present disclosure provides a solution for this need.

SUMMARY

A smart sensor can include a plurality of analog-to-digital converters (ADCs) configured to receive analog signals from a sensor module, and a plurality of channel modules. Each channel module can be connected to a respective ADC and each channel module can include a limited data processing module configured to provide initial processing. The sensor can include a data control module operatively connected to each of the plurality of channel modules and configured to select a selected channel of the plurality of channels to receive initially processed data from the limited data processing module of the selected channel. The data control module can be configured to interface with external memory to store data to the external memory and/or to read data from the external memory. The sensor can include a batch processing module operatively connected to the data control module and configured to receive the initially processed data of the selected channel from the data control module to provide further processing of the initially processed data.

The batch processing module can be a programmable logic device (PLD). The data control module can be configured to receive channel specific configuration data to reconfigure the batch processing module to provide a channel specific configuration for providing channel specific further processing of the initially processed data.

The initial processing can be non-resource intensive continuous processing and/or can have a fixed function. Each channel module can include a first-in-first-out (FIFO) buffer module operatively connected between the data control module and the limited data processing module to buffer data.

The data control module can be configured to iterate through each channel module to iteratively receive initially processed date therefrom to pass the initially processed data to at least a first portion of the external memory. The data control module can be configured to receive data from each FIFO buffer module as a function of sample count stored in each FIFO buffer module such that the initially processed data is pulled from the FIFO buffer having the highest sample count.

The data control module can include a data handler configured to handle data transfer between each channel, the batch processing module, and the external memory. The data control module can include a memory controller configured to interface the data handler with the external memory for storing data to and retrieving data from the external memory.

A distributed sensor system can include an external memory and a plurality of smart sensors. Each of the smart sensors can be or include any suitable smart sensor disclosed herein, e.g., described above.

A method of performing resource intensive processing on multiple channels of data can include initially processing data from a plurality of analog-to-digital converter (ADC) in real time in a plurality of channels as the data is made available by each ADC. Initially processing can include only partially processing the data from each ADC. The method can include cycling the initially processed data from each channel to a batch processing module through a data handler, and further processing the initially processed data at the batch processing module using more resources than during initially processing. Cycling the initially processed data can include cycling the initially processed data at a high rate allowing for both discrete and/or quasi-continuous event monitoring type acquisitions. The method can include any other suitable methods and/or portions thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 1 is a schematic view of an embodiment of a sensor in accordance with this disclosure;

FIGS. 2A, 2B, 2C, 2D, 2E, 2F, 2G, and 2H are schematic views of the embodiment of FIG. 1, shown in different states of data flow in accordance with this disclosure.

DETAILED DESCRIPTION

Figure 2A:
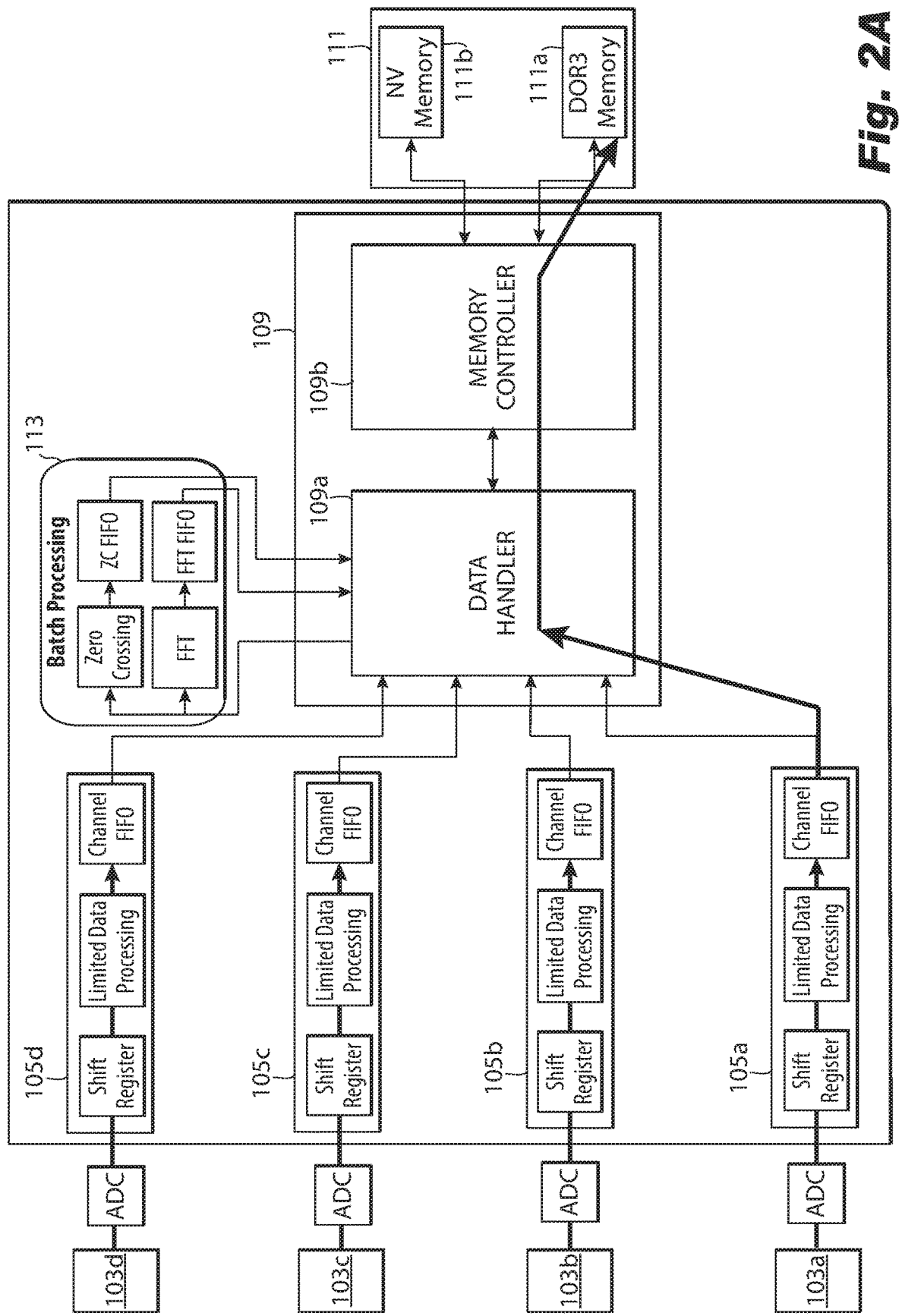
Figure 2B:
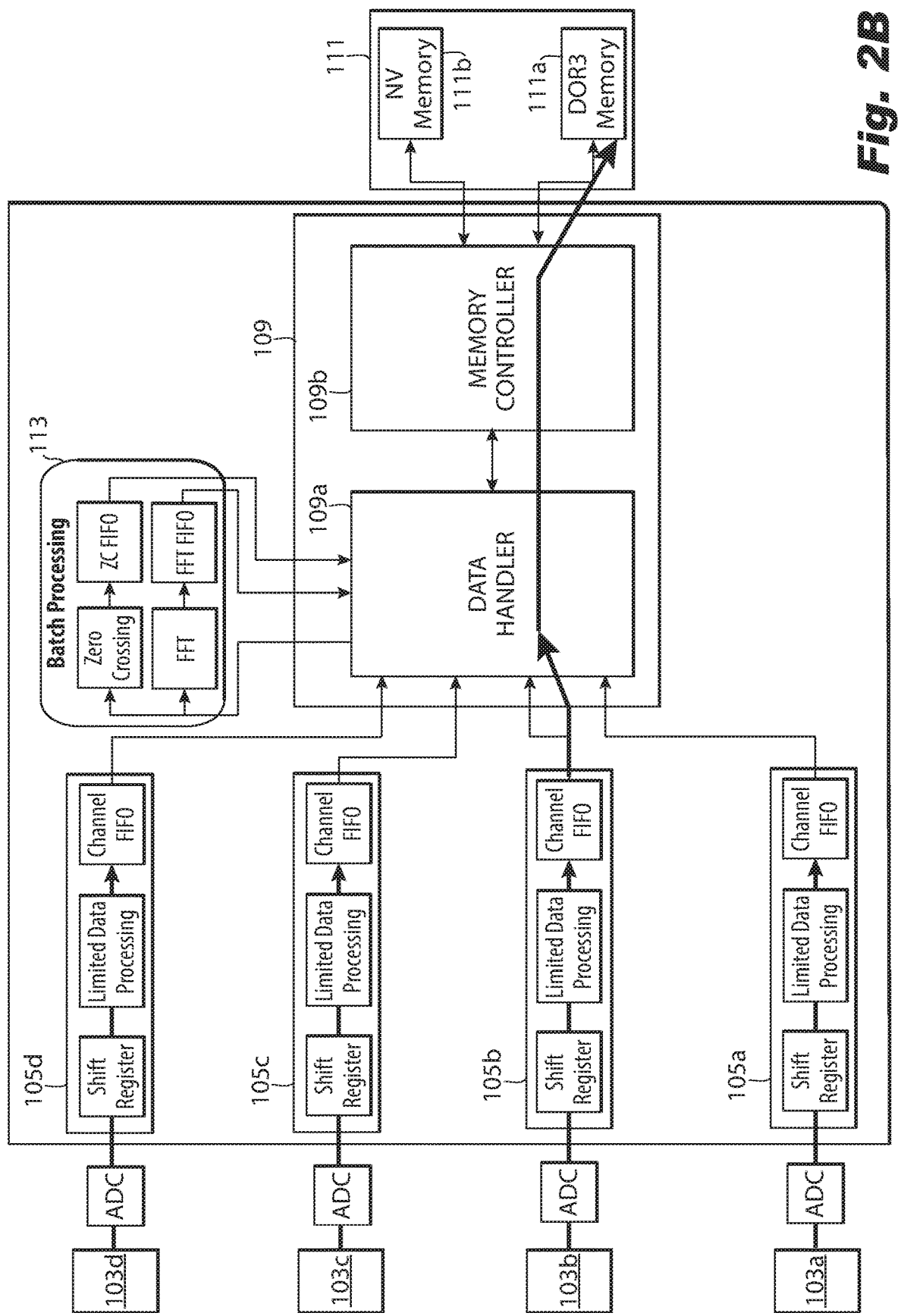
Figure 2C:
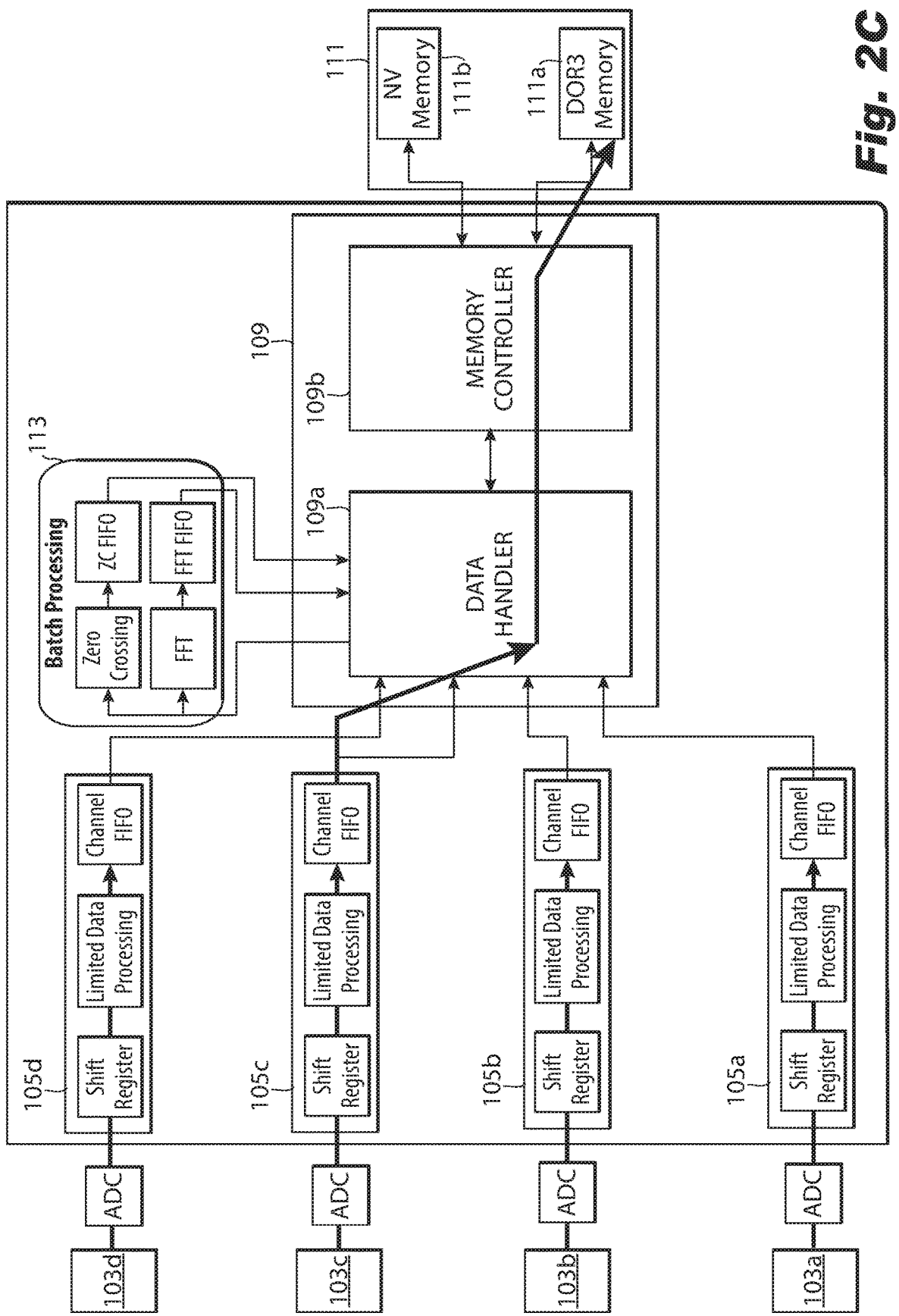
Figure 2D:
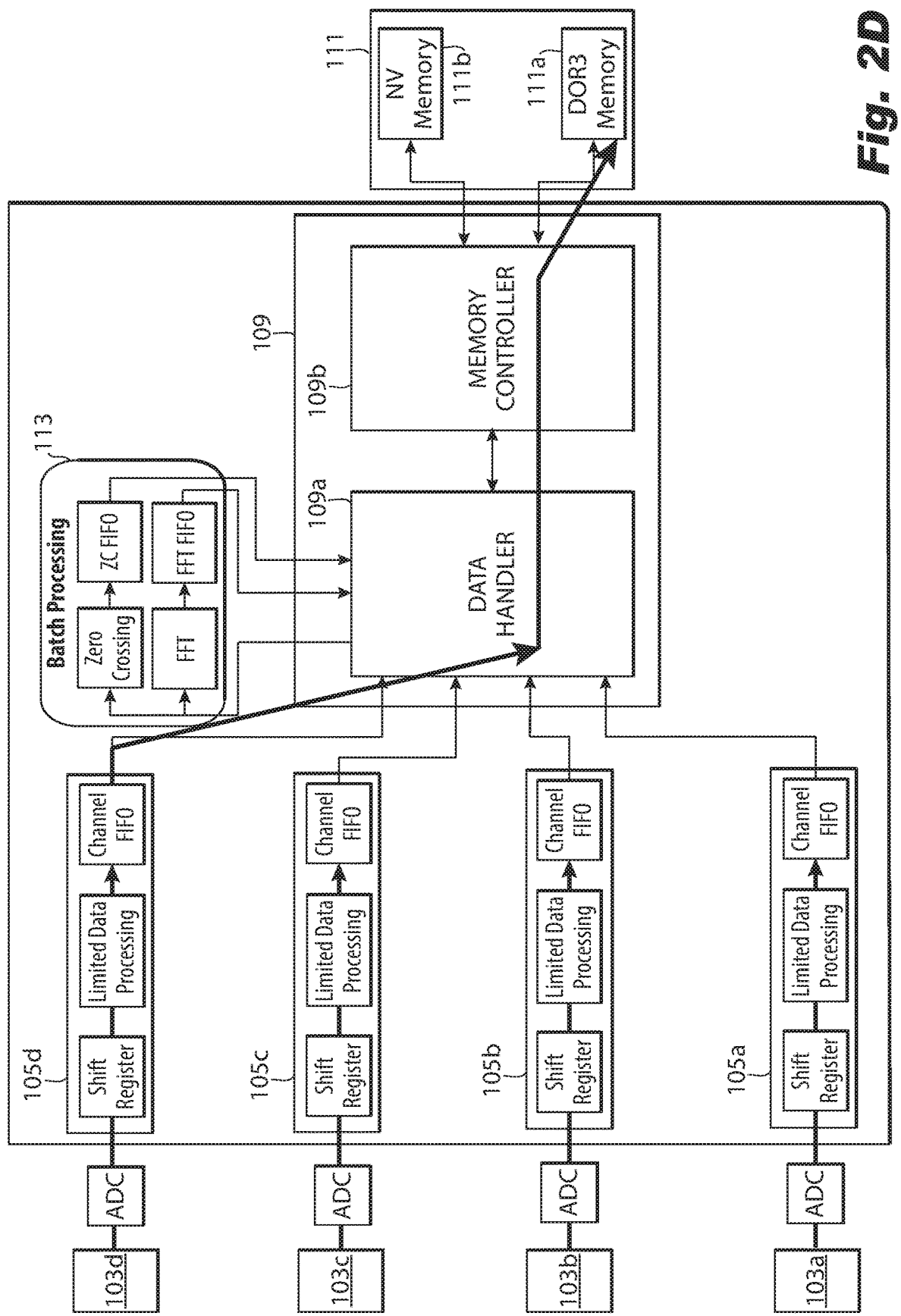

Reference will now be made to the drawings wherein like reference numerals identify similar structural features or aspects of the subject disclosure. For purposes of explanation and illustration, and not limitation, an illustrative view of an embodiment of a sensor in accordance with the disclosure is shown in FIG. 1 and is designated generally by reference character 100. Other embodiments and/or aspects of this disclosure are shown in FIGS. 2A-3.

Referring to FIG. 1, a smart sensor 100 can include a plurality of analog-to-digital converters (ADCs) 101a, b, c, d configured to receive analog signals from a sensor module 103a, b, c, d (e.g., one or more aircraft air data sensors). The smart sensor 100 can include a plurality of channel modules 105a, b, c, d. Each channel module 105a, b, c, d can be connected to a respective ADC 101a, b, c, d and each channel module 105a, b, c, d can include a limited data processing module 107a, b, c, d configured to provide initial processing (e.g., non-resource intensive processing, e.g., infrared filtering). Any suitable number of channel modules 105a, b, c, d is contemplated herein (e.g., 2, 3, 4, 5 . . . etc.).

The sensor 100 can include a data control module 109 operatively connected to each of the plurality of channel modules 105a, b, c, d and configured to select a selected channel (e.g., 105a) of the plurality of channels 107a, b, c, d to receive initially processed data from the limited data processing module (e.g., 107a) of the selected channel. The data control module 109 can be configured to interface with external memory 111 (e.g., which can include non-volatile memory and/or volatile memory, e.g., RAM) to store data to the external memory and/or to read data from the external memory 111.

The sensor 100 can include a batch processing module 113 operatively connected to the data control module 109 and configured to receive the initially processed data of the selected channel from the data control module 109 to provide further processing of the initially processed data. The batch processing module 113 can be or include any suitable hardware and/or software module(s) and/or be integrated with any other suitable hardware and/or software module of sensor 100, for example.

The batch processing module 113 can be or include or be part of a programmable logic device (PLD), e.g., an FPGA, or any other suitable device. The data control module 109 can be configured to receive channel specific configuration data to reconfigure the batch processing module 113 to provide a channel specific configuration for providing channel specific further processing of the initially processed data. For example, each channel module 105a, b, c, d can have its own associated batch processing module configuration such that batch processing module 113 is reconfigured for each channel and the more resource-intensive channel specific processing is carried out in the batch processing module 113, as desired for each channel.

The initial processing can be non-resource intensive continuous processing. In certain embodiments the limited data processing modules 107a, b, c, d can have a fixed function, but it is contemplated that the functions can be configured as a function limited processing configuration data (e.g., each limited data processing module 107a, b, c, d can be a PLD). Each channel module can include a first-in-first-out (FIFO) buffer module 115a, b, c, d operatively connected between the data control module 109 and the limited data processing module 107a, b, c, d to buffer data (e.g., as appreciated by those having ordinary skill in the art).

Referring additionally to FIGS. 2A-2D, the data control module 109 can be configured to iterate through each channel module 105a, b, c, d to iteratively receive initially processed date therefrom, e.g., to pass the initially processed data to at least a first portion (e.g., volatile memory 111b) of the external memory 111. The data control module 109 can be configured to receive data from each FIFO buffer module 115a, b, c, d as a function of sample count stored in each FIFO buffer module 115a, b, c, d such that the initially processed data is pulled from the FIFO buffer 115a, b, c, d having the highest sample count. In this regard, build-up of data in a FIFO can be prevented (e.g., where channel modules have different sample rates).

The data control module 109 can include a data handler 109a configured to handle data transfer between each channel module 105a, b, c, d, the batch processing module 113, and the external memory 111. The data control module 109 can include a memory controller 109b configured to interface the data handler 109a with the external memory 111 for storing data to and retrieving data from the external memory 111. The external memory 111 can include volatile memory (e.g., RAM) 111a and/or non-volatile memory 111b.

As shown in FIG. 2E-2H, each channel module 105a, b, c, d can have the respective limited processed data further processed differently by the batch processing module 113. The data control module 109 can correlate the selected channel module (and/or the data therefrom) to configuration data for the batch processing module 113, and the batch processing module 113 can be configured based on the selected channel module 105a, b, c, d and/or data therefrom. The batch processing module 113 can be configured to include any suitable processing functions (e.g., FFT, zero crossing) for any suitable purpose as appreciated by those having ordinary skill in the art. In certain embodiments, the processing functions of the batch processing module 113 can be consistent, and the data pathway between the functions can be modified to select which processing functions are performed and/or in what order.

Figure 2E:
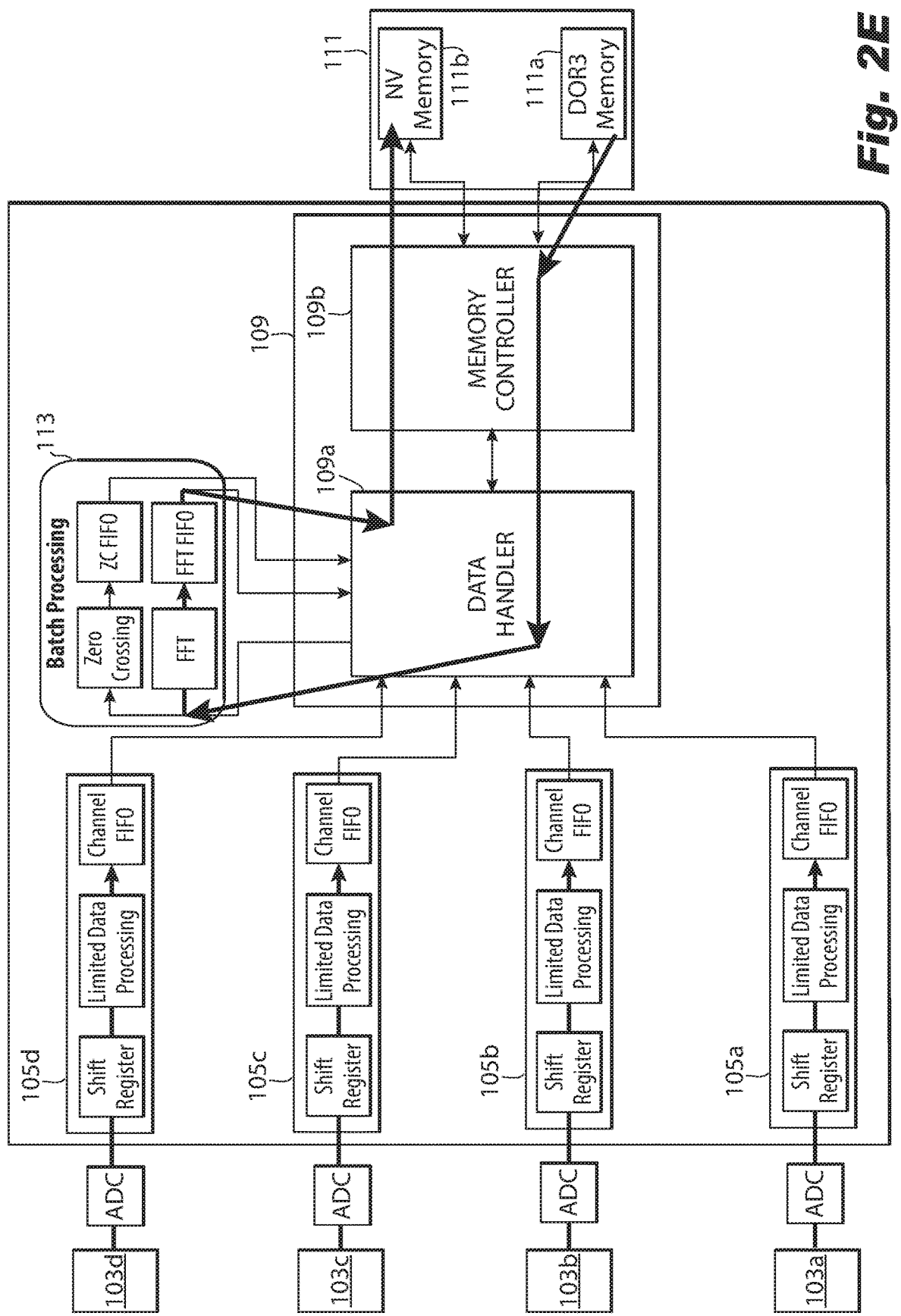
Figure 2G:
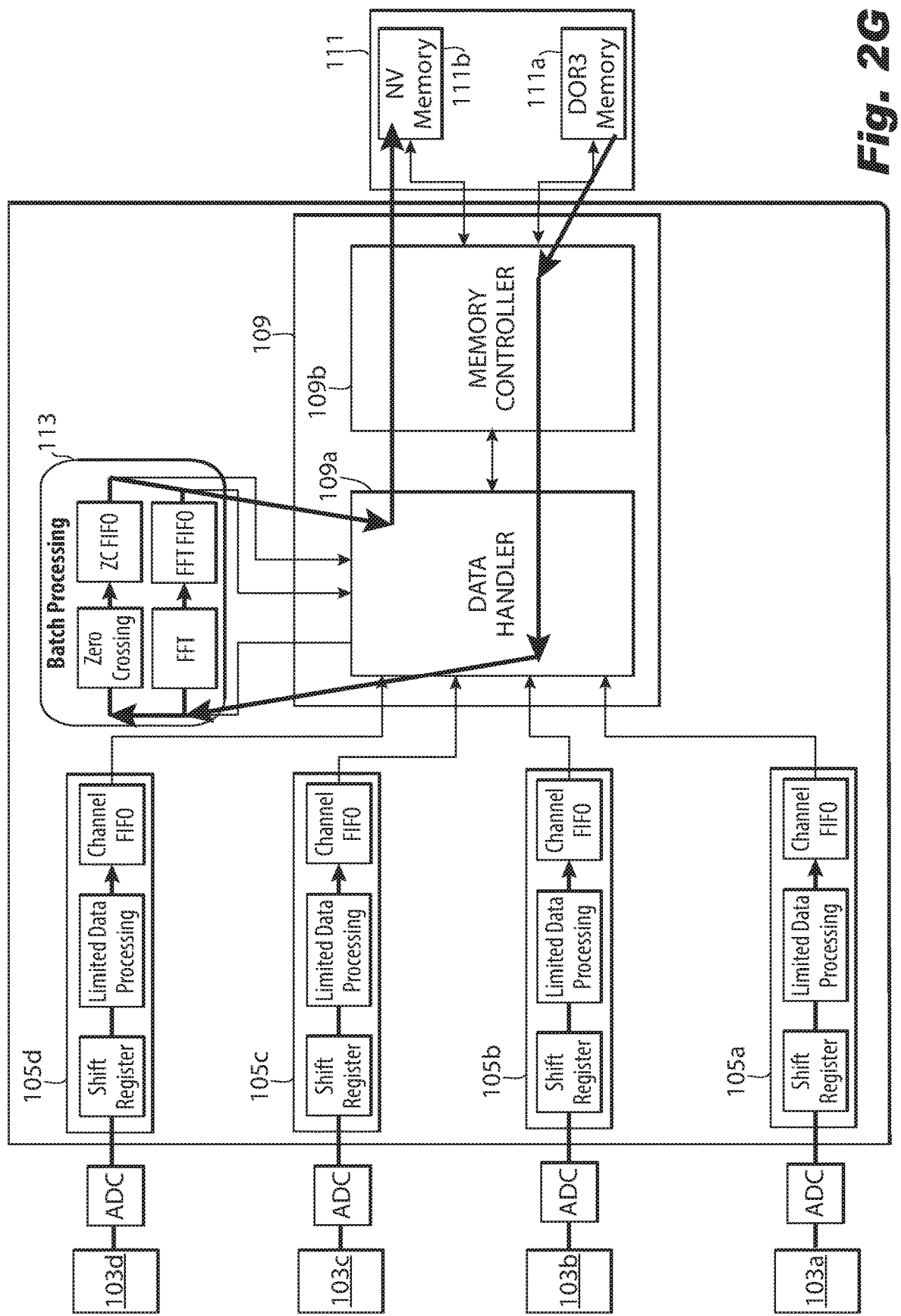

In certain embodiments, e.g., as shown in FIG. 2E-2G, the data control module 109 can pull stored data (e.g., limited processed data from a selected channel module when there is sufficient data to batch process) from the external memory 111, e.g., the first portion (e.g., the volatile memory 111a), and provide it to the batch processing module 113 to perform further processing thereon. As a non-limiting example, the data flow shown in FIGS. 2E, 2F, 2G, and 2H, can each correspond to the selected channel of FIGS. 2A, 2B, 2C, and 2D respectively. Any other suitable data flow for each selected channel is contemplated herein. After batch processing, the data control module 109 can be configured to store the batch processed data, e.g., correlating to each channel module, in the external memory 111, e.g., in a second portion (e.g., the non-volatile memory 111b as shown) thereof.

Figure 2H:
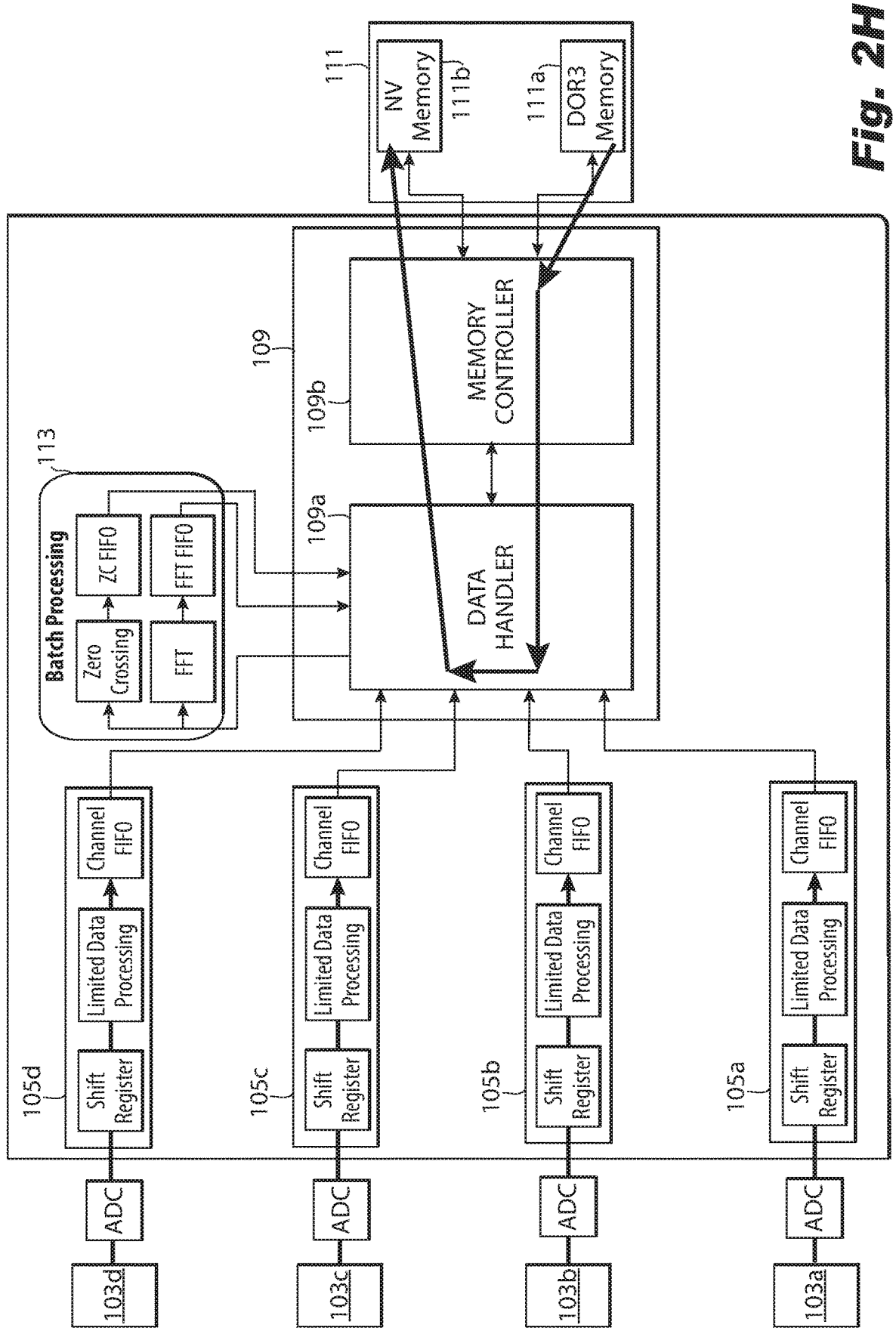
Figure 3:
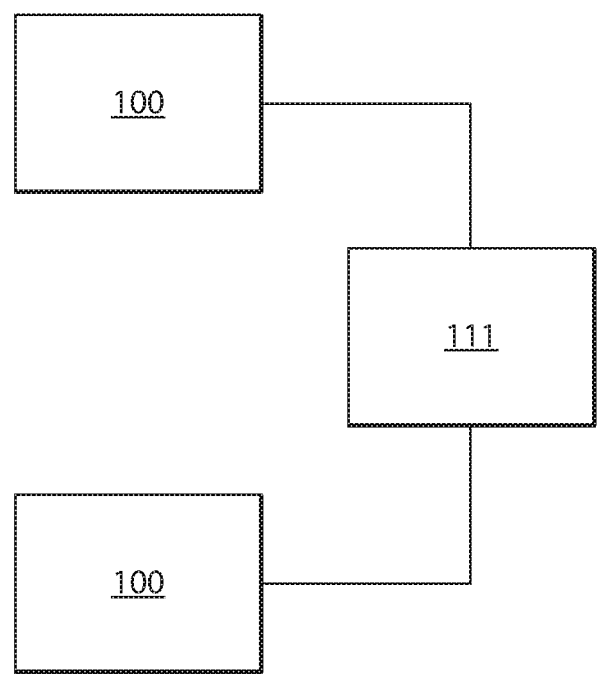
FIG. 3 is a schematic view of an embodiment of a system in accordance with this disclosure.

In certain embodiments, the limited processed data can be either stored by the data control module 109 in the external memory 111, e.g., the second portion (e.g., the non-volatile memory 111b) of the external memory 111, directly from the respective channel without batch processing (e.g., because no batch processing of the limited processed data of the respective channel module is desired). In certain embodiments, e.g., as shown in FIG. 2H, the data control module 109 can be configured to directly transfer data from the first portion (e.g., 111a) to the second portion (e.g., 111b) of the external memory 111 as a function of configuration data indicating no batch processing is desired. Any other suitable data flow is contemplated herein.

As shown, after batch processing, data can be sent to the external memory 111 for storage and/or use by any suitable system (e.g., an aircraft system). Any other suitable use for the output of the batch processing module 113 is contemplated herein.

Any module or other suitable component of the sensor 100 can include any suitable hardware and/or software module configured to perform the disclosed function thereof, for example. In certain embodiments, the sensor 100 can be an FPGA device and the various portions can be modules of the FPGA, for example. Any other suitable arrangement and/or delineation of components is contemplated herein. Any other suitable components and/or modules are also contemplated herein (e.g., a shift register as shown).

In accordance with at least one aspect of this disclosure, a distributed sensor system 200 can include an external memory 111 and a plurality of smart sensors 100. Each of the smart sensors 100 can be or include any suitable smart sensor disclosed herein, e.g., described above.

In accordance with at least one aspect of this disclosure, a method of performing resource intensive processing on multiple channels of data can include initially processing data from a plurality of analog-to-digital converter (ADC) in real time in a plurality of channels as the data is made available by each ADC. Initially processing can include only partially processing the data from each ADC. The method can include cycling the initially processed data from each channel to a batch processing module through a data handler, and further processing the initially processed data at the batch processing module using more resources than during initially processing. Cycling the initially processed data can include cycling the initially processed data at a high rate allowing for both discrete and/or quasi-continuous event monitoring type acquisitions. The method can include any other suitable methods and/or portions thereof.

In embodiments, each ADC can be acquiring data at the same time. Each ADC can have a hardware specific sampling time. After the ADC, data can be processed in limited a processing module. Limited processing can be limited to non-resource intensive functions (e.g., an IR filter, for example). The limited processed data can be collected in a channel FIFO. The data samples can be held there until the data handler prompts the release of the data. A long queue of data can exist in each FIFO, thus instead of a large FIFO for complex data, embodiments can have a smaller FIFO ultimately linked to larger external memory. The external memory can allow buffering of data in the memory instead of in each FIFO.

Embodiments include channel FIFOs that are directly interfacing with a data handler (and thus external memory) instead of a batch processing controller. Without external memory, the FIFOs would have to be very large. When enough data is available, the data handler can retrieve data from the memory, stream the data directly into batch processing block function. Each batch processing block can be configured on the fly by stored configuration data (e.g., FPGA configuration data) in order to properly process each channel data fully. The batch processing blocks can be iterated through functions by iteratively changing the configuration data, and iteratively receiving data from memory for each channel.

After batch processing, all processing can be complete as if each channel had its own full processing capability, yet embodiments can provide a smaller faster device (e.g., at least partially by utilizing existing systems like data handler and memory system while saving complexity on each channel processing function and using a configurable block to perform other functions).

In a programmable logic device (PLD), the maximum event detection time ($t_{ED}$) is equal to the sampling period multiplied by the number of samples used in the calculation of the feature ($n_{samp}*t_{samp}$) plus the additional latency associated with performing the calculations after receiving $n_{samp}$ samples ($t_{proc}$). In order to minimize $t_{ED}$, the PLD should perform processing as samples are made available wherever possible, taking advantage of $t_{samp}$ to help reduce $t_{proc}$. Furthermore, the design may be desired to be implemented such that $t_{proc} < t_{samp}$ so that the design may perform continuous event monitoring. In a smart sensor containing multiple input channels, this may require the instantiation of multiple copies of the same data processing algorithms for use on each separate channel within the PLD. However, some data processing algorithms can require large numbers of PLD resources, demanding the use of a high performance and costly PLD. Accordingly, embodiment can include a method to minimize the resource usage of a data processing firmware design while minimizing $t_{ED}$.

Smart sensing systems can be required to compute many different types of features on multiple input channels. In a PLD, it can be impractical to have separate processing modules for every potential feature calculation due to the limited numbers of resources in the device. Typically the calculation of different features utilizes similar subsets of processing blocks with different configurations. (e.g., features use low pass filters but with different coefficients). Embodiments enable creation of configurable processing blocks that utilize configuration information to perform calculations with different coefficients. Processing blocks may also be given enable/disable functionality so that if the block is not utilized in the calculation of a feature then it passes through the output of the previously enabled block. For features that are typically utilized for a smart sensing system application, embodiments can include established sequences of configurable processing blocks with an enable/disable functionality that covers all desired feature calculations. This allows for multiple types of feature calculations to utilize the same subset of processing blocks within the PLD, for example, significantly reducing the resource use of the design.

In a smart sensor system with multiple input channels, a design utilizing a configurable sequence of processing blocks may still require the sequence of processing blocks be instantiated for each input channel. This can result in resource use inefficiency, as multiple copies of the same module can be instantiated. Embodiments, however, can separate processing into two types, continuous and batched. Continuous processing blocks can be implemented separately for each input channel, and batched processing blocks can be implemented once and can perform calculations for all input channels. This approach allows separation of processing blocks into batched and continuous to help reduce the resource usage since batched blocks only need to be instantiated once within the PLD fabric rather than once for each input channel. Separating the processing blocks into continuous and batched also allows the user to balance the relationship of resource usage with $t_{proc}$, ensuring the maximum $t_{ED}$ remains low. Separation of individual data processing blocks can be based on the resource usage and latency associated with each one, for example. If this approach is implemented such that the latency of the batched processing algorithms ($t_{proc,batched}$) is less than $t_{samp}$, then such embodiments will be able to perform continuous event monitoring.

The processing modules can function by receiving the number of samples required to perform the calculation of a feature ($n_{samp}$) (i.e. for a single FIR filter $n_{samp}$=the number of filter coefficients). As the processing block in the PLD is receiving samples for the ADC at a sampling rate $t_{samp}$ it can store calculated values in on-chip memory locations. Due to this behavior the processing block can receive $n_{samp}$ samples from a single data source (i.e. one input channel) before receiving samples from a different data source. For a batched processing approach, the data from other external channels can be buffered while other channels are being processed, and a controller can switch the input to the batched processing block between data channels. Since large buffers are required if there are substantial sampling rate differences between data channels, an external memory can be used to store data (e.g., DDR3 as shown). Furthermore, the data control module can be able to select which channel to perform processing on based on the number of samples available in that channels buffer. This can eliminates the situation where a data channel with a low sampling rate is selected before the correct number of samples have been buffered, which could cause overflow in other high rate data channel buffers, for example.

Through the use of batched processing blocks, embodiments allow for the use of a low cost, small, and low power FPGAs in a smart sensing system. In order to implement batched processing blocks, embodiments can have a batched processing controller (e.g., the data handler) and an external memory controller. The batched processing controller can be implemented so that it can intelligently switch between input channels based on the sampling rate of that particular channel. The batched processing controller can also provide functionality to enable or disable certain processing blocks as indicated by the processing configuration.

Embodiments can include a method of performing resource intensive processing on multiple channels of data (sensor or other I/O) using a FPGA. For each channel, a configurable set of processing steps requiring minimal resources can be selected to occur in real time as the data is made available by the ADC. The data from all channels can then be passed to a data handler. The data handler can cycles data from each channel to a batch processing block to perform a selected set of configurable resource intensive acquisitions. The data handler can cycle the channels through the batch processing module at a high rate, allowing for both discrete and quasi-continuous event monitoring type acquisitions. Embodiment can include a method for minimizing the resource footprint of processing blocks in a PLD based smart sensing system by limiting the number of instantiated processing blocks performing the same type of calculation.

Embodiments can allow for intensive processing to occur for multiple channels of data near the sensing location with a low cost and low complexity processing device, and can allow for the processing to be configured to meet the needs of wide range of applications. This combination can enable a scalable, lightweight, low cost system that can be sized appropriately to meet the needs of a wide range of applications with minimal application specific work.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A smart sensor, comprising:
   a plurality of analog-to-digital converters (ADCs) configured to receive analog signals from a sensor module;
   a plurality of channel modules, each channel module connected to a respective ADC, each channel module comprising a limited data processing module configured to provide initial processing;
   a data control module operatively connected to each of the plurality of channel modules and configured to select a selected channel of the plurality of channels to receive initially processed data from the limited data processing module of the selected channel, the data control module configured to interface with external memory to store data to the external memory and/or to read data from the external memory; and
   a batch processing module operatively connected to the data control module and configured to receive the initially processed data of the selected channel from the data control module to provide further processing of the initially processed data, wherein the batch processing module is configured to switch between the plurality of channels based on a sampling rate of a respective channel.

2. The smart sensor of claim 1, wherein the batch processing module is a programmable logic device (PLD), wherein the data control module is configured to receive channel specific configuration data to reconfigure the batch processing module to provide a channel specific configuration for providing channel specific further processing of the initially processed data.

3. The smart sensor of claim 2, wherein the initial processing is non-resource intensive continuous processing and/or has a fixed function.

4. The smart sensor of claim 3, wherein each channel module includes a first-in-first-out (FIFO) buffer module operatively connected between the data control module and the limited data processing module to buffer data.

5. The smart sensor of claim 4, wherein the data control module is configured to iterate through each channel module to iteratively receive initially processed date therefrom to pass the initially processed data to at least a first portion of the external memory.

6. The smart sensor of claim 5, wherein the data control module is configured to receive data from each FIFO buffer module as a function of sample count stored in each FIFO buffer module such that the initially processed data is pulled from the FIFO buffer having the highest sample count.

7. The smart sensor of claim 6, wherein the data control module includes a data handler configured to handle data transfer between each channel, the batch processing module, and the external memory.

8. The smart sensor of claim 7, wherein the data control module includes a memory controller configured to interface the data handler with the external memory for storing data to and retrieving data from the external memory.

9. A distributed sensor system, comprising:
   an external memory; and
   a plurality of smart sensors, each of the plurality of smart sensor comprising:
      a plurality of analog-to-digital converters (ADCs) configured to receive analog signals from a sensor module;
      a plurality of channel modules, each channel module connected to a respective ADC, each channel module comprising a limited data processing module configured to provide initial processing;
      a data control module operatively connected to each of the plurality of channel modules and configured to select a selected channel of the plurality of channels to receive initially processed data from the limited data processing module of the selected channel, the data control module configured to interface with the external memory to store data to the external memory and/or to read data from the external memory; and
      a batch processing module operatively connected to the data control module and configured to receive the initially processed data of the selected channel from the data control module to provide further processing of the initially processed data, wherein the batch processing module is configured to switch between the plurality of channels based on a sampling rate of a respective channel.

10. The system of claim 9, wherein the batch processing module is a programmable logic device (PLD), wherein the data control module is configured to receive channel specific configuration data to reconfigure the batch processing module to provide a channel specific configuration for providing channel specific further processing of the initially processed data.

11. The system of claim 10, wherein the initial processing is non-resource intensive continuous processing and/or has a fixed function.

12. The system of claim 11, wherein each channel module includes a first-in-first-out (FIFO) buffer module operatively connected between the data control module and the limited data processing module to buffer data.

13. The system of claim 12, wherein the data control module is configured to iterate through each channel module to iteratively receive initially processed date therefrom to pass the initially processed data to at least a first portion of the external memory.

14. The system of claim 13, wherein the data control module is configured to receive data from each FIFO buffer module as a function of sample count stored in each FIFO buffer module such that the initially processed data is pulled from the FIFO buffer having the highest sample count.

15. The system of claim 14, wherein the data control module includes a data handler configured to handle data transfer between each channel, the batch processing module, and the external memory.

16. The system of claim 15, wherein the data control module includes a memory controller configured to interface the data handler with the external memory for storing data to and retrieving data from the external memory.

17. A method of performing resource intensive processing on multiple channels of data, comprising:
   initially processing data from a plurality of analog-to-digital converter (ADC) in real time in a plurality of channels as the data is made available by each ADC, wherein initially processing includes only partially processing the data from each ADC;
   cycling the initially processed data from each channel to a batch processing module through a data handler, wherein cycling includes switching between the plurality of channels based on a sampling rate of a respective channel; and
   further processing the initially processed data at the batch processing module using more resources than during initially processing.

18. The method of claim 17, wherein cycling the initially processed data includes cycling the initially processed data at a high rate allowing for both discrete and/or quasi-continuous event monitoring type acquisitions.

\* \* \* \* \*